United States Patent [19]
Kondo et al.

[11] 3,901,029
[45] Aug. 26, 1975

[54] MANIFOLD REACTOR

[75] Inventors: Katsumi Kondo; Fumiyoshi Noda; Yuji Watanabe, all of Toyota, Japan

[73] Assignee: Toyota Jidosha Kogyo Kabushiki Kaisha, Toyota, Japan

[22] Filed: Dec. 19, 1973

[21] Appl. No.: 426,123

[30] Foreign Application Priority Data
Feb. 13, 1973 Japan.................. 48-17076

[52] U.S. Cl. ............ 60/282; 60/272; 60/323; 264/59; 264/317; 264/DIG. 44
[51] Int. Cl.² .................... F01N 3/00; B29C 1/08
[58] Field of Search ............ 60/272, 282, 323, 321; 264/59, 317, DIG. 44

[56] References Cited
UNITED STATES PATENTS

| | | | |
|---|---|---|---|
| 1,721,442 | 7/1929 | Frink | 264/DIG. 44 |
| 2,678,529 | 5/1954 | Buchi | 60/321 |
| 3,123,886 | 3/1964 | Miller | 264/DIG. 44 |
| 3,413,803 | 12/1968 | Rosenlund | 60/274 |
| 3,418,399 | 12/1968 | Ziegler | 264/317 |
| 3,768,260 | 10/1973 | Glenn | 60/282 |

*Primary Examiner*—Douglas Hart
*Attorney, Agent, or Firm*—Stevens, Davis, Miller & Mosher

[57] ABSTRACT

An exhaust gas purifying apparatus comprising a secondary combustion chamber composed of a combustion cylinder enclosed by heat insulating material with an air gap therebetween, said insulating material being enclosed and supported by an outer casing.

In manufacturing the exhaust gas purifying apparatus, the combustion cylinder is coated with easily combustible materials, to a predetermined thickness, and subsequently disposed within the outer casing with a predetermined gap or space therebetween. Heat-insulating material in a form of sludge is poured into said gap or space and solidified. Thereafter, the combustible material is burnt away and removed.

1 Claim, 3 Drawing Figures

MANIFOLD REACTOR

The present invention relates to a method and an apparatus for purifying the exhaust gas of an internal combustion engine, wherein the unburned fuel components contained in the exhaust gases from such an engine may be burned positively by introducing the exhaust gases into a secondary combustion chamber together with air before feeding them to the exhaust or discharging conduit, and permitting the mixture to dwell in the chamber for a certain time.

In hitherto known exhaust gas purifying apparatus, fibrous heat insulating materials, such as ceramic fibers, are directly packed fluid-tightly between a combustion chamber for burning unburned fuel components contained in the exhaust gases and the outer casing enclosing the combustion chamber. In this type of the purifying apparatus, however, the combustion cylinder is subjected to repeated expansion and contraction under the heat of exhaust gases and is thereby damaged, so that the heat insulating material may enter the interior of the combustion cylinder and be scattered into the atmosphere. Solid insulating materials such as alumina castable or fused silica castable cannot follow the expansion and contraction of the combustion cylinder, as a result of which if they are used, they are damaged and the powders of the insulating materials are again scattered into the atmosphere.

An object of the present invention is to overcome the above-mentioned difficulties which are inherent in conventional purifying apparatus. For this purpose, the present invention provides a method and an apparatus for purifying the exhaust gas, in which a solid material is used as the heat insulating material and, at the same time, an air gap is provided between the combustion cylinder and the heat insulating material, whereby the influence of the expansions and contractions of the combustion cylinders is prevented from being exerted on the heat insulating materials.

Other objects, advantages and novel features of the present invention will be apparent from the following detailed description of a preferred embodiment of the invention in conjunction with the annexed drawings wherein.

Figure 1:
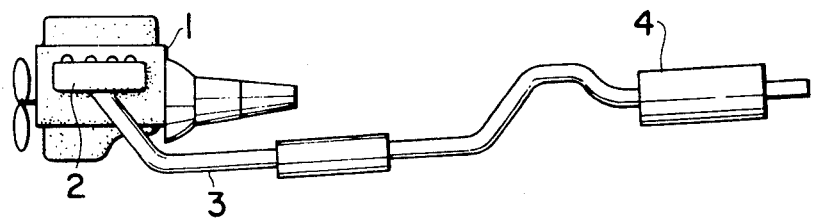
FIG. 1 shows generally an arrangement of an exhaust gas discharging path for an internal combustion engine.
Figure 2:
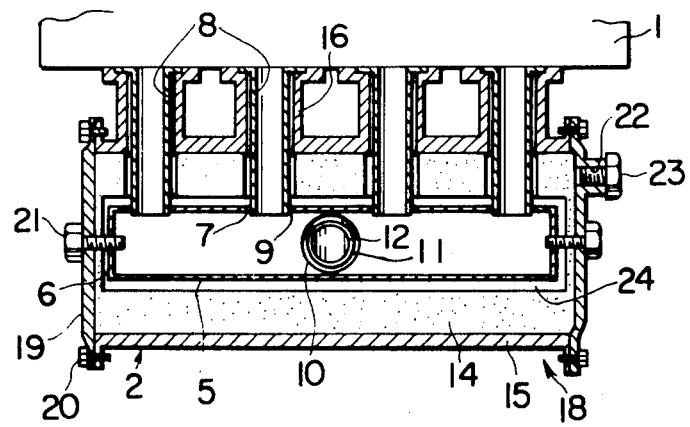
FIG. 2 is a longitudinal sectional view of an exhaust gas purifying apparatus according to the present invention.
Figure 3:
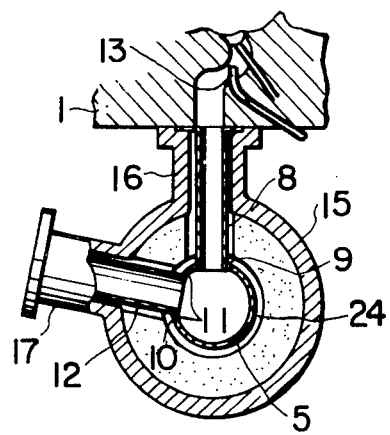
FIG. 3 is a cross-section of the same.

Referring to the drawings, reference numeral 1 indicates an internal combustion engine which has an exhaust gas purifying apparatus 2 connected thereto. The purifying apparatus is adapted to be supplied with the exhaust gas from the engine and air from an air pump, not shown. An exhaust gas discharge conduit 3 and a muffler 4 are connected to said apparatus 2, so that exhaust gas is discharged into the atmosphere following the secondary combustion in the purifying apparatus 2.

The exhaust gas purifying apparatus 2 comprises a combustion cylinder 5 for secondary combustion of the exhaust gas from the engine 1. The cylinder 5 is tightly closed by plates 6 at both the axial ends thereof. The combustion cylinder 5 has a side wall formed with the same number of openings 7 as the working cylinders of the engine. Four gas conduits 8 are provided in the case of a four cylinder engine. One end of each gas inlet conduit 8 is disposed within one of said respective openings 7. These conduits 8 supply the exhaust gas from the engine 1 to the combustion cylinder 5.

One end of a discharge conduit 12 is inserted into an outlet port 10 formed in the side wall of the cylinder. Conduit 12 functions to discharge the gas from the combustion cylinder 5. An air injection opening 13 is formed in the vicinity of the exhaust gas outlet of the engine 1.

Paper tapes are wound to the thickness of ca. 1mm on the outer peripheral surfaces of the combustion cylinder 5 as well as the portions of the inlet and outlet conduits 8 and 12 which are positioned within an enclosing outer cylinder 15 hereinafter described. There are gaps 9 and 11 between the cylinder 5 and the inlet and the outlet conduits 8 and 12 formed at the respective connecting portions and these gaps are filled with the wound paper tapes. An outer casing 18 is formed integrally from an outer cylinder 15 surrounding said combustion cylinder 5 and inlet and outlet conduits 8, 12 with clearance at 14 between the outer cylinder 15 and the inner cylinder 5. The outer cylinder 15 is closed by covers 19 secured by bolts 20 at both ends. The end covers 19 are secured to the side plates 6 of the combustion cylinder 5 with bolts 21 to thereby hold the latter in the middle portion of the outer cylinder 15. The outer casing 18 may be made dividable into several sections for facilitating the mounting process. One of the covers 19 is formed with an inlet port 22 which can be closed by a plug 23. Sludgy fused silica castable comprising fused silica, alumina cement and water is poured into the gap or clearance space 14 through the port 22, aged for 24 hours and then dried for 5 hours at the temperature of 100°C to form the solid heat insulating material block or layer 24. Finally, the paper tapes remaining between the insulating material block 24 and the combustion cylinder 5 are burnt by heating the outer case 18 including the combustion cylinder 5 or alternatively, by feeding a high temperature gas into the cylinder 5. Cinders of the burnt paper are expelled into the interior of the combustion cylinder 5 by way of the gap 9 between the cylinder 5 and the conduit 8 and the gap 11 between the cylinder 5 and the conduit 12 and may be removed therefrom through the inlet conduits 8 or outlet conduit 12. The exhaust gas purifying apparatus is now completed with a gap 25 where the paper tapes were previously located.

The exhaust gas purifying apparatus constructed in the manner as described above is then mounted on the engine 1 and the exhaust gases from the engine and the air from the injection opening 13 are supplied into the combustion chamber 5 through the inlet conduit 8. The unburnt fuel contained in the exhaust gas is now completely burned within the cylinder 5 and the exhaust gases therefrom are then discharged through the outlet conduit 12, exhaust gas conduit 3 and the muffler 4.

An experiment was carried out to examine the possible damage to the heat-insulating material of the purifying apparatus. At first, the interior of the combustion cylinder 5 was heated to ca. 900°C for 10 minutes by driving the engine 1 with fuel, and then the temperature within the combustion cylinder 5 was cooled to ca. 90°C for 5 minutes with the engine being at this time driven by an external power. These heating and cooling processes were repeated for 100 hours. No damage to the block of the heat-insulating material was noticed.

As another raw material for making the heat insulating material, a sludgy mixture of 30% of foamed perlite and 70% of monoaluminum phosphate involving 50% water was employed and poured into the gap or hollow space 14 within the outer cylinder 15, heated at 200°C for an hour and then solidified. Thereafter, the assembly was heated at 600°C for an hour to form the heat-insulating block having gaps 9 and 11 as well as the air gap 25. Alternatively, a sludgy mixture of 80% of cordierite and 20% of monoaluminum phosphate involving 50% water was poured into the space 14 within the outer cylinder 15, heated at 200°C for an hour to be solidified and additionally heated at 600°C for an hour to form a solid heat-insulating block having the air gaps 25, 9 and 11. The heat-insulating blocks thus obtained showed the same good test result as in the foregoing embodiment.

Still another method for molding the heat-insulating material block will next be described. The outer peripheral surface of the combustion cylinder 5 as well as the outer surface portions of the conduits 8 and 12 extending within the outer cylinder 15 are coated with a layer of foamed polyethylene or vinyl chloride of a thickness of 0.3mm to 1.0mm. After having mounted the outer cylinder assembly 15 in the way as hereinbefore mentioned, a sludgy mixture of 80% of cordierite and 20% of monoaluminum phosphate involving 50% water is poured into the hollow space 14 within the outer cylinder 15, heated at 200°C for an hour and additionally heated at 600°C for 30 minutes to form the solid heat-insulating block. Alternatively, the outer periphery of the combustion cylinder 5 as well as the associated outer wall portions of the conduits 8 and 12 may be coated with a layer of graphite or wood shavings having thickness of ca. 0.5mm. The sludgy castable is poured into the space 14 within the cylinder 15, cured for 24 hours and thereafter maintained at the temperature of 110°C to form a heat-insulating block. In these molding methods, polyethylene, vinyl chloride, graphite and chips are burnt away as in the foregoing embodiment. The heat-insulating block thus molded showed the same good test result as in the preceding embodiment.

Advantages of the present invention are as follows:

a. Because the air gap is provided between the combustion cylinder and the block of the heat insulating material, repeated expansion and contraction of the charging conduit, combustion cylinder and discharging conduit caused by the high temperature exhaust gases flowing there-through cannot be transmitted to the heat insulating block, so that the latter is protected from any damages or injuries.

b. Direct heat transfer from the combustion cylinder to the insulating material block is prevented.

c. Air gap serves to improve the heat insulating effect to the combustion cylinder.

Although the invention has been described with reference to preferable embodiments of the invention, it should be understood that those skilled in the art can make various changes and modifications in the form of the invention without departing from the spirit and scope of the invention.

We claim:

1. Method of manufacturing the apparatus for purifying exhaust gases from an internal combustion engine comprising covering to a pre-determined thickness the exterior of a combustion cylinder as well as its inlet conduits and its outlet conduit with an easily combustible material, disposing an outer casing coaxially to and at a pre-determined spacing from said combustion cylinder, pouring heat-insulating material in the form of sludge into the space between said casing and cylinder, and burning away and removing said easily combustible materials remaining between said heat-insulating material and said combustion cylinder after said heat-insulating material has been hardened.

* * * * *